United States Patent
Lee

(10) Patent No.: US 11,229,097 B2
(45) Date of Patent: Jan. 18, 2022

(54) METHOD AND APPARATUS FOR ADJUSTING THE RATE OF CHANGE OF THE BRIGHTNESS OF A LIGHT EMITTING DIODE (LED) LIGHT FIXTURE

(71) Applicant: DICON FIBEROPTICS, INC., Richmond, CA (US)

(72) Inventor: Jeffrey Lee, El Sobrante, CA (US)

(73) Assignee: DICON FIBEROPTICS, INC., Richmond, CA (US)

(*) Notice: Subject to any disclaimer, the term of this patent is extended or adjusted under 35 U.S.C. 154(b) by 4 days.

(21) Appl. No.: 16/872,136

(22) Filed: May 11, 2020

(65) Prior Publication Data

US 2021/0274613 A1  Sep. 2, 2021

Related U.S. Application Data

(60) Provisional application No. 62/982,563, filed on Feb. 27, 2020.

(51) Int. Cl.
*H05B 45/14* (2020.01)
*H05B 45/3577* (2020.01)

(52) U.S. Cl.
CPC ......... *H05B 45/14* (2020.01); *H05B 45/3577* (2020.01)

(58) Field of Classification Search
CPC .... H05B 45/10; H05B 45/14; H05B 45/3577; H05B 47/11; H05B 47/16
See application file for complete search history.

(56) References Cited

U.S. PATENT DOCUMENTS

| | | | | |
|---|---|---|---|---|
| 5,264,761 | A * | 11/1993 | Johnson | G05F 1/455 315/194 |
| 5,586,890 | A * | 12/1996 | Braun | G06K 7/0021 439/66 |
| 5,949,197 | A * | 9/1999 | Kastner | H05B 41/3927 315/291 |
| 6,016,038 | A * | 1/2000 | Mueller | H05B 47/155 315/291 |
| 6,586,890 | B2 * | 7/2003 | Min | H05B 45/3725 315/224 |
| 7,038,399 | B2 * | 5/2006 | Lys | H05B 45/3725 315/291 |

(Continued)

*Primary Examiner* — Abdullah A Riyami
*Assistant Examiner* — Syed M Kaiser
(74) *Attorney, Agent, or Firm* — Vierra Magen Marcus LLP

(57) ABSTRACT

Light emitting diode (LED) lighting fixtures are presented that use a low-pass filter to smooth out or eliminate discrete, step changes in LED light fixture brightness, that may result from the use of digital brightness level settings. Because some lighting applications require a fast response to changes in the set brightness level, and some applications require a slower response, one set of examples use a switchable RC low-pass filter circuit, with two or more selectable RC time constant values. Another set of examples use a programmable resistance integrated circuit to achieve a more continuously-variable time constant, for greater flexibility in adjusting the response time of the LED lighting fixture, in response to user brightness inputs. The user is able to control the maximum rate of change of the LED light fixture's brightness, in response to changes in the brightness setting.

30 Claims, 7 Drawing Sheets

(56) References Cited

U.S. PATENT DOCUMENTS

| | | | | |
|---|---|---|---|---|
| 7,956,694 B1* | 6/2011 | Wilson | ............... | H05B 39/08 |
| | | | | 331/12 |
| 8,487,546 B2* | 7/2013 | Melanson | ............ | H05B 45/20 |
| | | | | 315/291 |
| 9,095,019 B2* | 7/2015 | Chen | ............ | H05B 45/10 |
| 9,723,680 B2* | 8/2017 | Pope | ............ | H05B 45/20 |
| 2007/0085489 A1* | 4/2007 | Robinson | ......... | H05B 45/3725 |
| | | | | 315/224 |
| 2011/0084623 A1* | 4/2011 | Barrow | ............ | H05B 45/375 |
| | | | | 315/250 |
| 2012/0212145 A1* | 8/2012 | Chan | ............ | H05B 45/3725 |
| | | | | 315/200 R |
| 2012/0262080 A1* | 10/2012 | Watanabe | ......... | H05B 45/3725 |
| | | | | 315/210 |
| 2012/0286663 A1* | 11/2012 | Puvanakijjakorn | ......... | |
| | | | | H05B 45/3575 |
| | | | | 315/85 |
| 2012/0299500 A1* | 11/2012 | Sadwick | ............ | H05B 45/32 |
| | | | | 315/224 |
| 2013/0234612 A1* | 9/2013 | Zeng | ............ | H05B 45/10 |
| | | | | 315/200 R |
| 2014/0265935 A1* | 9/2014 | Sadwick | ............ | H05B 45/18 |
| | | | | 315/307 |
| 2015/0237694 A1* | 8/2015 | Zudrell-Koch | ... | H05B 41/3924 |
| | | | | 315/307 |
| 2015/0359053 A1* | 12/2015 | van den Broeke | ......... | |
| | | | | H05B 45/3725 |
| | | | | 315/200 R |
| 2017/0174120 A1* | 6/2017 | Sassoon | ............ | B60Q 1/04 |
| 2020/0312225 A1* | 10/2020 | Hussell | ............ | G09G 3/2003 |

* cited by examiner

METHOD AND APPARATUS FOR ADJUSTING THE RATE OF CHANGE OF THE BRIGHTNESS OF A LIGHT EMITTING DIODE (LED) LIGHT FIXTURE

PRIORITY CLAIM

This application claims the benefit of U.S. provisional pat. app. 62/982,563, filed Feb. 27, 2020, which is hereby incorporated in its entirety by this reference.

BACKGROUND

This disclosure relates generally to the circuitry used to control the brightness and dimming of Light Emitting Diode (LED) light fixtures, and more specifically relates to an apparatus and method for adjusting the rate of change of the brightness of an LED light fixture, in response to changes in a control input.

The brightness of an LED, string of LEDs, or a collection of LED strings in a lighting fixture, can be adjusted by a number of methods and circuits. Generally speaking, in order to control the brightness of LEDs, it is necessary to control the average level of current flowing in the LEDs, either by controlling the level of a constant, direct current (DC), or, by periodically interrupting the flow of current in the LEDs. For some lighting applications it is desirable for the light fixture's brightness to change relatively slowly, even if there has been a sudden change in the user input. In other lighting applications, a more rapid, or nearly instantaneous response is desired. LED lighting fixtures are generally capable of responding very quickly, or nearly instantaneously, to changes in user input. However, this is not always a desirable feature.

SUMMARY

In one set of embodiments, an apparatus includes a light emitting diode (LED) driver, a controller, and an adjustable low pass filter circuit. The LED driver is configured to receive a first control voltage and to drive one or more connected LEDs at a brightness level dependent upon a level of the first control voltage. The controller is configured to provide a first output voltage in response to a first user input and to provide a first one of a plurality of dimming rate settings in response to a second user input, or as a response to the first user input. The adjustable low pass filter circuit has a plurality of selectable time constant values and is configured to: receive and filter the first output voltage from the controller and provide the filtered first output voltage as the first control voltage to the first LED driver, and receive the first dimming rate setting from the controller and to filter changes in the first output voltage from the controller at one of the time constant values selected in response to the first dimming rate setting.

In other embodiments, a lighting system includes multiple LED lighting units and a system controller. Each of the LED lighting units includes one or more LEDs, one or more LED drivers, a micro-controller, and an adjustable filter. The LED drivers are connected to the LEDs and to receive a control voltage, the one or more LED drivers configured to drive the LEDs to have a brightness level dependent on the control voltage. The micro-controller is configured to receive a user control signal and, in response to the user control signal, provide an output voltage and a dimming rate setting. The adjustable filter is connected to the driver and the micro-controller and configured to receive an output voltage, filter changes in the output voltage with one of a plurality of time constants selected in response to the dimming rate setting, and supply the filtered output voltage to the driver as the control voltage. The system controller is connected to the plurality of LED lighting units, the system controller configured to supply an individual control signal to each of the LED lighting units to independently specify the output voltage and the dimming rate setting for each of the micro-controllers.

Various aspects, advantages, features and embodiments are included in the following description of examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Figure 1:
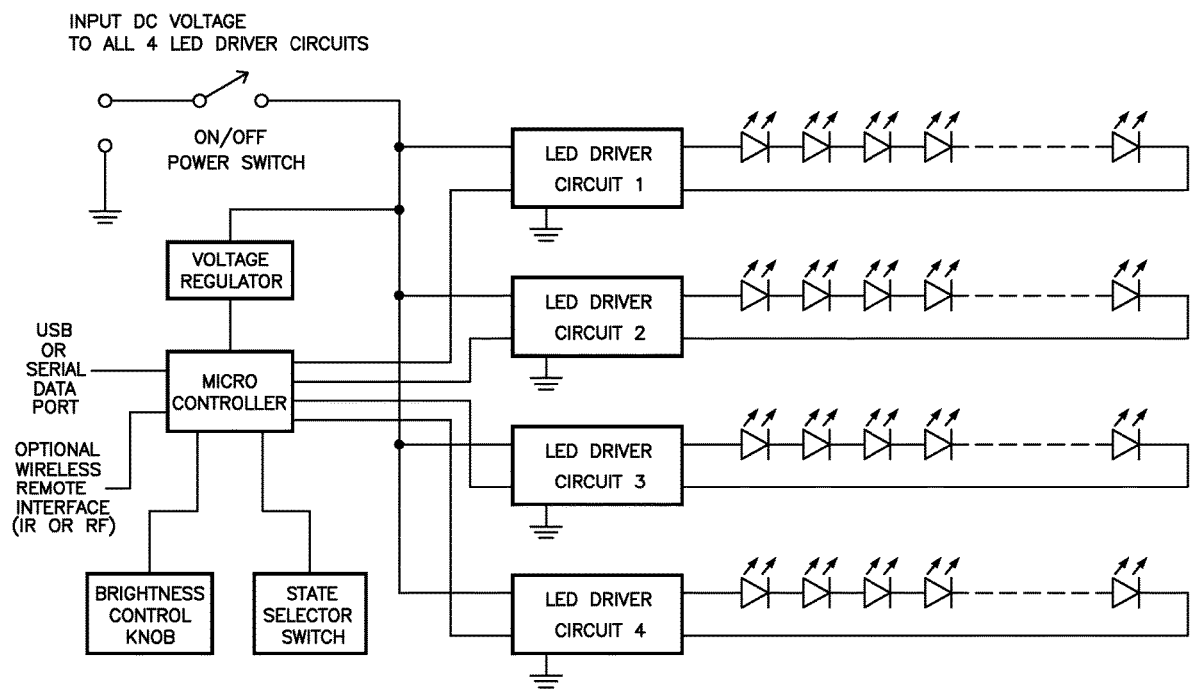
FIG. 1 illustrates a block diagram of an LED light fixture, with multiple LED driver circuits, controlled by a micro-controller.

The following presents embodiments that use a low-pass filter to smooth out or eliminate discrete, step changes in LED light fixture brightness, that may result from the use of digital brightness level settings, or rapidly changing analog brightness level settings. Because some lighting applications require a fast response to changes in the set brightness level, and some applications require a slower response, one set of embodiments uses a switchable RC low-pass filter circuit, with two or more selectable RC time constant values. Another set of embodiments use a programmable resistance integrated circuit, to achieve a more continuously-variable time constant, for greater flexibility in adjusting the response time of the LED lighting fixture, in response to user brightness inputs. In both embodiments, the user is able to control the maximum rate of change of the LED light fixture's brightness, in response to changes in the brightness setting. In other embodiments, a controller within the light fixture may automatically adjust or set the time constant of the RC filter circuit, in response to changes in the received brightness level settings.

The brightness of an LED, or a string of LEDs, or a collection of LED strings in a lighting fixture, can be adjusted by several well-known prior art methods and circuits. Generally speaking, in order to control the brightness of LEDs, it is necessary to control the average level of current flowing in the LEDs, either by controlling the level of a constant, direct current (DC), or, by periodically interrupting the flow of current in the LEDs. For purposes of discussion, the controlling of the DC current flowing in the LEDs can be referred to as analog dimming. The use of a periodically interrupted current, in order to reduce the average current flow through the LEDs, can be referred to as PWM (pulse width modulation) dimming.

Depending on the frequency of a PWM-based dimming control, the use of PWM may result in a variety of flickering effects. For this reason, LED lights that are designed for use in film and television production will often use analog dimming, where an analog control voltage is used to directly control or determine the current level in the LEDs or LED strings, thereby controlling their brightness. Much of the discussion that follows is most directly applicable to LED light fixtures that make use of analog dimming. However, in some cases, the discussion also applies to LED light fixtures that use PWM dimming. Regardless of the dimming method used, digital control signals may be used to set the desired dimming or brightness level.

In both forms of dimming, the driver circuits for the LEDs are being adjusted in response to some form of user input, that is applied by the user of the light fixture. The user input may be in the form of a manually-controlled brightness knob or slider, or it may be in the form of an encoded input, received from a computer, or some other form of controller system. For example, commercially-available DMX (digital multiplex) controllers, such as are defined in the DMX-512 standard, are frequently used to control the brightness (as well as other parameters) of light fixtures, using a serial bus protocol in which 8-bit digital values are sent to the light fixture, to establish brightness on a 0-255 scale.

For some lighting applications, it is important to consider the dynamics and timing of changes in brightness settings, or the desired rate of change of the light fixture's brightness, in response to changes of user input. For some lighting applications it is desirable for the light fixture's brightness to change relatively slowly, even if there has been a sudden change in the user input. In other lighting applications, a more rapid, or nearly instantaneous response is desired. LED lighting fixtures are generally capable of responding very quickly, or nearly instantaneously, to changes in user input. However, this is not always a desirable feature. In contrast, traditional tungsten filament incandescent lighting generally responds relatively slowly to changes in user brightness controls. In the case of a very fast change in the user's brightness input (in the extreme case, the flipping on and off of a switch), a tungsten filament light will change brightness relatively slowly. This creates a perception of "smooth dimming".

Another consideration for the control of the brightness of LED lighting fixtures is related to quantization effects, when the user input for the control of the light fixture's brightness is in digital form. In the case of DMX control, the intended brightness setting is in the form of an 8-bit digital value, resulting in a brightness scale with 256 discrete steps or values (0-255). Slow changes in the brightness value, especially at low brightness levels (for example, changing the DMX value from 0 to 1, or from 4 to 5) may be perceptible as discrete change (or "step") in brightness, rather than as a smooth change or transition. Even if the user input is originally an analog input, such as a potentiometer-based brightness knob or slider, lighting fixtures with intelligent controllers may be digitizing the knob setting, creating a digital brightness setting that in turn is used to control the LEDs and LED strings. (The digital brightness setting would then be converted to an analog voltage, in the case of analog dimming, or to a PWM signal, in the case of PWM dimming.) When the light fixture controller uses this digital brightness setting, it may result in some form of discrete, step changes in the actual brightness of the light fixture, depending on the resolution (i.e., the number of bits) used to store the digital brightness settings. The use of high-resolution digital-to-analog converter (DAC) integrated circuits, with 10, 12, 14, or 16 bit resolution, helps to avoid the visibility of discrete, step changes in brightness. However, at low brightness levels, the human eye is highly sensitive to even very small changes in brightness.

Another factor is the rate at which user input changes are "read" or detected by the LED light fixture's controller. A DMX controller may be controlling as many as 512 controllable parameters over a large number of light fixtures and other devices. The refresh rate of a specific DMX channel may be at a 44 Hz rate, or even slower. In addition, the rate at which the LED light fixture's internal controller scans for, or recognizes changes in user inputs, depends on the design of the controller's hardware and firmware (or software). This can create discrete, step changes in the controller's view of the intended brightness settings, even if the original user input was changing in a smooth, continuous way.

FIG. 1 shows a generic block diagram of an LED light fixture, with multiple LED driver circuits, controlled by a micro-controller. Four LED driver circuits are shown, although the number of LED driver circuits will depend on the application, the total number of LEDs to be driven, and the need to adjust the spectrum of the LED light fixture. Each of the LED driver circuits is providing a controlled current to a series string of LEDs. A micro-controller receives user inputs from a variety of switches, control knobs, serial control interfaces, and/or wireless interfaces. In many embodiments, DMX control signals would be received over a serial control interface, although DMX signals may also be sent over a wireless interface, or they may be embedded in some form of packet data protocol or format. (It should also be noted that DMX controllers with Remote Device Management (RDM) capability can not only send control information to light fixtures and other devices, but can also read or receive information from RDM-compatible light fixtures and other devices.) Based on these user inputs, the micro-controller, and its firmware or embedded software, determines how much current each LED driver circuit should be providing to its LED string, thereby determining the brightness of each of the LED strings. The ability to independently control multiple, separate LED strings, means that the user can not only control the overall brightness of the LED light fixture, but may also control other parameters of the light output, including color, color temperature (for white light), and other lighting effects. In some cases, it will be desirable for the micro-controller to be able to quickly change the amount of current flowing in a particular LED string (and hence the brightness of that LED string), in response to a change in a user input. In other cases, it will be desirable for the LED string's current to change more slowly or smoothly, in response to a change in user input.

Figure 2:
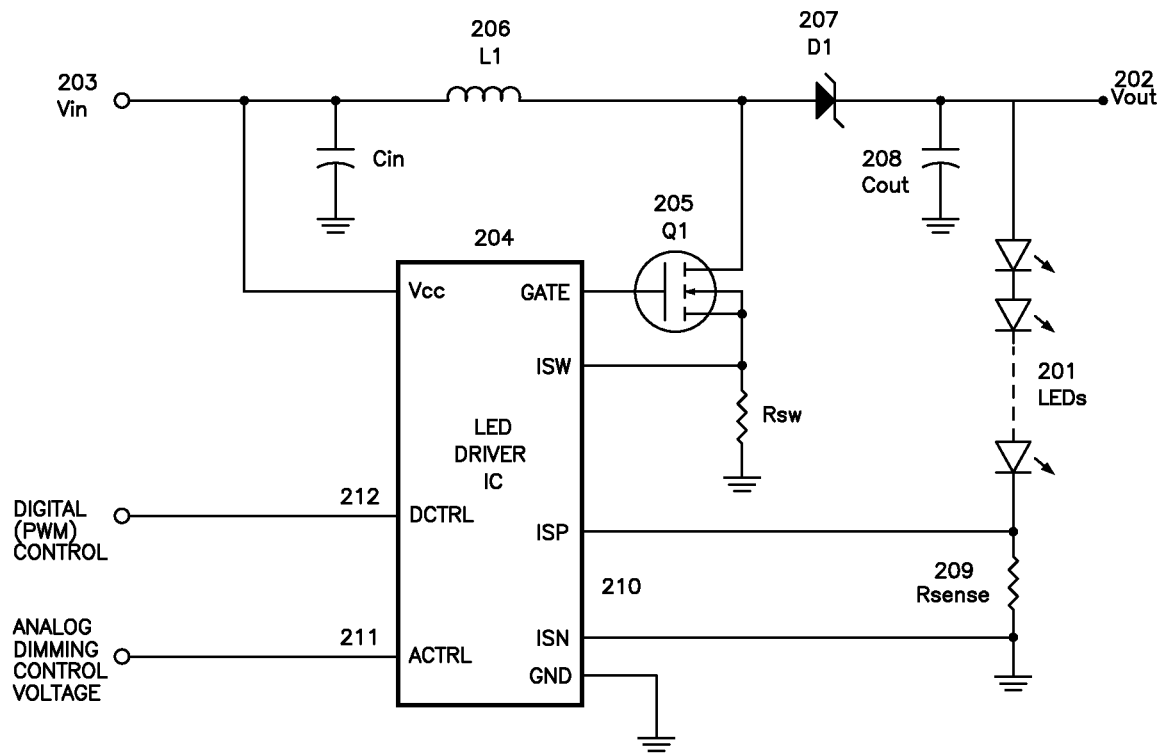
FIG. 2 shows a block diagram of a representative LED driver circuit, driving a string of LEDs, with both analog and digital dimming control inputs.

FIG. 2 shows a somewhat more detailed view of an example of a LED driver circuit, that provides a regulated, constant current to a string of LEDs (201). The LEDs (201) are connected in series, to ensure that the current is identical in each of the LED devices. The constant-current design is relatively insensitive to the number of LEDs in the string, as long as the total voltage drop across the string is lower the designed maximum output voltage of the driver circuit.

The LED driver circuit shown in FIG. 2 is configured as a boost converter, in that the output voltage $V_{OUT}$ (202) is intended to be a higher voltage than the input voltage $V_{IN}$ (203). An LED driver circuit may also be configured as a buck converter, with $V_{OUT}$ designed to be a lower voltage than $V_{IN}$, or as a buck-boost converter, in which $V_{OUT}$ may be either higher or lower than $V_{IN}$. One skilled in the art of LED driver circuit design will understand that the embodiments presented in the following are applicable to many configurations of the driver circuit(s), including boost, buck, and buck-boost regulators. The specific LED driver circuit shown in FIG. 2 is therefore intended to be representative of multiple LED driver circuit configurations. Many commercially available prior art LED driver ICs are designed to be used in boost, buck, or buck-boost configurations, with different configurations of the external components.

As stated above, the LED driver circuit of FIG. 2 is configured as a boost regulator, in which the input voltage $V_{IN}$ (at 203) is boosted to create an output voltage $V_{OUT}$ (at 202). The boost in voltage is controlled by LED driver IC 204, by controlling the switching of MOSFET Q1 205, using a typical boost regulator design that incorporates an inductor L1 206, a diode D1 207, and an output capacitor $C_{OUT}$ 208. Feedback is used to regulate and control the switching of Q1 205. In order to achieve a regulated, constant current, the voltage across a sense resistor, $R_{SENSE}$ 209 is fed to the driver IC 204 via pins ISP and ISN 210. This voltage is proportional to the current flowing in the LED string, and the driver IC 204 regulates the switching of Q1 205 to maintain a designed constant current level. $V_{OUT}$ (202) may therefore vary, depending on the number of LED devices in the LED string, and on their total forward voltage drop when driven with the designed constant current. The value of $R_{SENSE}$ 209 is therefore chosen to result in the desired constant current value for the LED string 201 at maximum brightness (i.e., without dimming).

Many commercially available LED driver ICs are designed to support both analog dimming, and digital or PWM dimming. In the LED driver circuit of FIG. 2, the DCTRL input 212 of the LED driver IC 204 is intended to be driven by a PWM signal, such that the current flowing in the LED strings is turned on and off at a rapid rate. The duty cycle of the PWM control signal therefore determines the percentage of time that the LED string current is on (at maximum current) and off. The human eye integrates the two brightness levels, such that the perceived brightness of the LED string is proportional to the duty cycle of the PWM control signal. However, depending on the frequency of the PWM control signal, flickering effects may still be detected by cameras, even if the flickering is not visible to the human eye. Flickering effects that are detected by cameras may then be visible to the human eye during playback or viewing of the recorded image(s).

For this reason, it is often preferred to use current-based analog dimming for image capture applications to avoid unwanted flickering effects. In FIG. 2, current-based analog dimming is provided by supplying a control voltage to the ACTRL pin 211 of the LED driver IC 204. Varying the voltage applied to the ACTRL pin 211 results in a reduction of the current through the LED string 201, reducing the current from the maximum current value that is established or set by the value of $R_{SENSE}$ 209. The range of control voltages required at the ACTRL pin 211 is a function of the specific driver IC used. In the discussion that follows, the assumption is that a voltage of less than 0.2 volts is intended to result in no current through the LED string, and that a voltage that is greater than or equal to 1.2 volts is intended to result in maximum current through the LED string, as determined by $R_{SENSE}$, but other embodiments can be used. Voltages between 0.2 volts and 1.2 volts are therefore intended to linearly scale the current from 0 mA to IMAX. It should also be noted that it is possible for the micro-controller to provide a PWM dimming signal, that is converted to an analog voltage by passing the PWM signal through a low-pass filter that converts the PWM signal to an analog voltage, with the voltage being proportional to the duty cycle of the PWM signal. From the standpoint of the LED driver IC, this method of dimming behaves like analog dimming.

Figure 3:
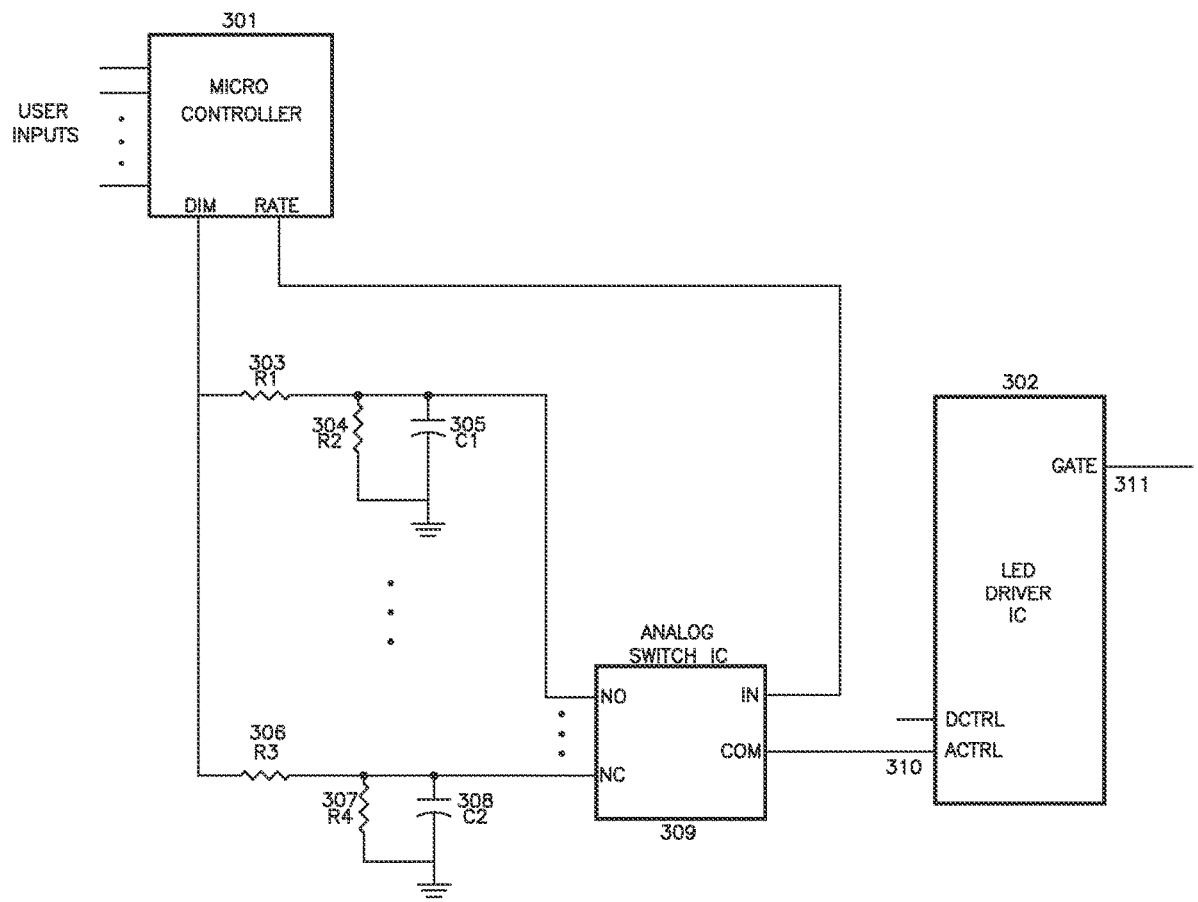
FIG. 3 shows a block diagram of one embodiment using an analog switch IC to switch between two distinct RC low-pass filters, with two different filter time constants.

FIG. 3 shows a partial block diagram of an embodiment in which an analog switch integrated circuit (IC) 309 is used to select between two separate RC low-pass filters, with differing time constants, to control the brightness setting of an LED string. For simplification, FIG. 3 does not show a complete block diagram of the LED driver circuit. In FIG. 3, the micro-controller 301 can be similar to the micro-controller that is shown in FIG. 1, and would typically be used to control multiple LED driver circuits, although only a single LED driver circuit 302 is shown. To simplify the discussion, FIG. 3 only shows the micro-controller signals that are specific to the aspects discussed here. Similarly, the LED driver IC 302 of FIG. 3 can be essentially the same as shown in FIG. 2. FIG. 3 omits the other discrete components of the LED driver circuit, which are shown in FIG. 2, with only the ACTRL control pin 310 and DCTRL control pin shown for the input signals and only the GATE pin 311 of the output pins be explicitly represented in the FIG. 3. Operation of the LED driver circuit of FIG. 3 can be largely as described in reference to FIG. 2, but FIG. 3 introduces the use of a switch-selectable RC low-pass filter, to filter or smooth the analog dimming control voltage being fed to the LED driver IC's analog dimming control pin ACTRL 310.

The micro-controller of FIG. 3 receives user inputs, such as a DMX signal, over a variety of input types such as USB or serial data ports, a wireless remote interface, or other user interfaces, and provides outputs such as the shown DIM and RATE outputs. More generally, there can be multiple sets of such outputs for additional LED drivers, as well as outputs for additional functions. Other user interfaces may include knobs, sliders, and switches, for manual control of various functions of the light fixture.

In FIG. 3, an analog dimming control voltage is provided by the micro-controller 301, on its pin labeled DIM. Instead of feeding this analog dimming control voltage directly to the ACTRL pin 310 of the LED driver IC 302, it is fed to two separate RC low pass filters. The first low-pass filter, comprising resistor R1 303, resistor R2 304, and capacitor C1 305, is intended to implement a "fast" low-pass filter response, with a relatively short time constant. Note that this circuit topology is also providing a voltage divider function, to scale the voltage range at the micro-controller's DIM pin, to the voltage range expected by the LED driver IC 302. The time constant $t_1$ for this low-pass filter is the effective resistance of R1 303 and R2 304 in parallel, multiplied by the capacitance of C1 305.

Similarly, the second low-pass filter, comprising resistor R3 306, resistor R4 307, and capacitor C2 308, is intended to implement a "slow" low-pass filter response, with a relatively long time constant. The time constant $t_2$ for this low-pass filter is the effective resistance of R3 306 and R4 307 in parallel, multiplied by the capacitance of C2 308. One skilled in the art of electronic circuit design will recognize that a broad range of component values for R1 303, R2 304, and C1 305, and R3 306, R4 307, and C2 308, can be used to achieve the desired voltage dividers for the two low-pass filters, as well as the desired "fast" and "slow" time constants. Alternate embodiments can use other low-pass filter configurations, including higher-order filters. However, for many applications, simple first-order RC filters are adequate, and require a minimum number of components. Other embodiments can have more than two selectable low-pass filters to provide a wider choice of time constant values. Additionally, although each of the low-pass filters in the shown embodiments has a single capacitor and multiple resistors, with one or more switches to select the filter elements, other embodiments can use different arrangements. For example, in embodiments where there are more than two choices of filter time constant, there can be multiple switches used to select between them. In addition to filter configurations with one capacitor and multiple resistors, alternate embodiments can have one resistance with multiple capacitors, or separate resistances and capacitors for each time constant setting, along with switches for these elements that can be used to configure the filter. Other embodiments can use more complex R-C filters with more than one pole (or cut-off frequency). For example, one set of embodiments can include an additional low-capacitance capacitor alongside of the main, higher-value capacitor to compensate for non-ideal behavior at very high frequencies for the higher-value capacitor. It is also true that the "fast" (short) time constant filter can be used to also perform the function of converting a PWM dimming signal from the micro-controller's DIM pin, into an analog voltage, to be fed to the ACTRL pin 310 of the LED driver IC 302.

In the embodiment shown in FIG. 3, an analog switch IC 309 is used to select between the two (or more) RC low-pass filters. Analog switch integrated circuits are readily available commercially. In a typical analog switch IC, a digital control signal (labeled in FIG. 3 as IN) is used to determine whether the NO (normally open) pin of the device is connected to the COM (common) pin, or if the NC (normally closed) pin of the device is connected to the COM pin. The normally closed and normally open nomenclature is based on traditional mechanical switches or relays. In the embodiment shown in FIG. 3, a logic signal RATE is provided by the micro-controller 301, to select which of the RC low-pass filters is being used to filter the micro-controller's DIM signal, as applied to the ACTRL (analog dimming control) pin 310 of the LED driver IC 302. It should be noted that the logic signal RATE, provided by micro-controller 301, can be based on a directly received external user input, either from an external controller, such as a DMX controller, or from user inputs such as a knob, slider, or switch. In other embodiments, the micro-controller 301 could base its choice of the RATE logic level on its analysis of other user inputs, such as the dynamic behavior of the brightness signal, or on user selection of special features, modes of operation, or lighting effects. For example, the micro-controller 301 might set the logic signal RATE to select the slow time constant filter as a default, and then autonomously set the logic signal RATE to select the fast time constant filter, if the micro-controller 301 detected rapid changes on the received brightness signal from the external user inputs.

Figure 4:
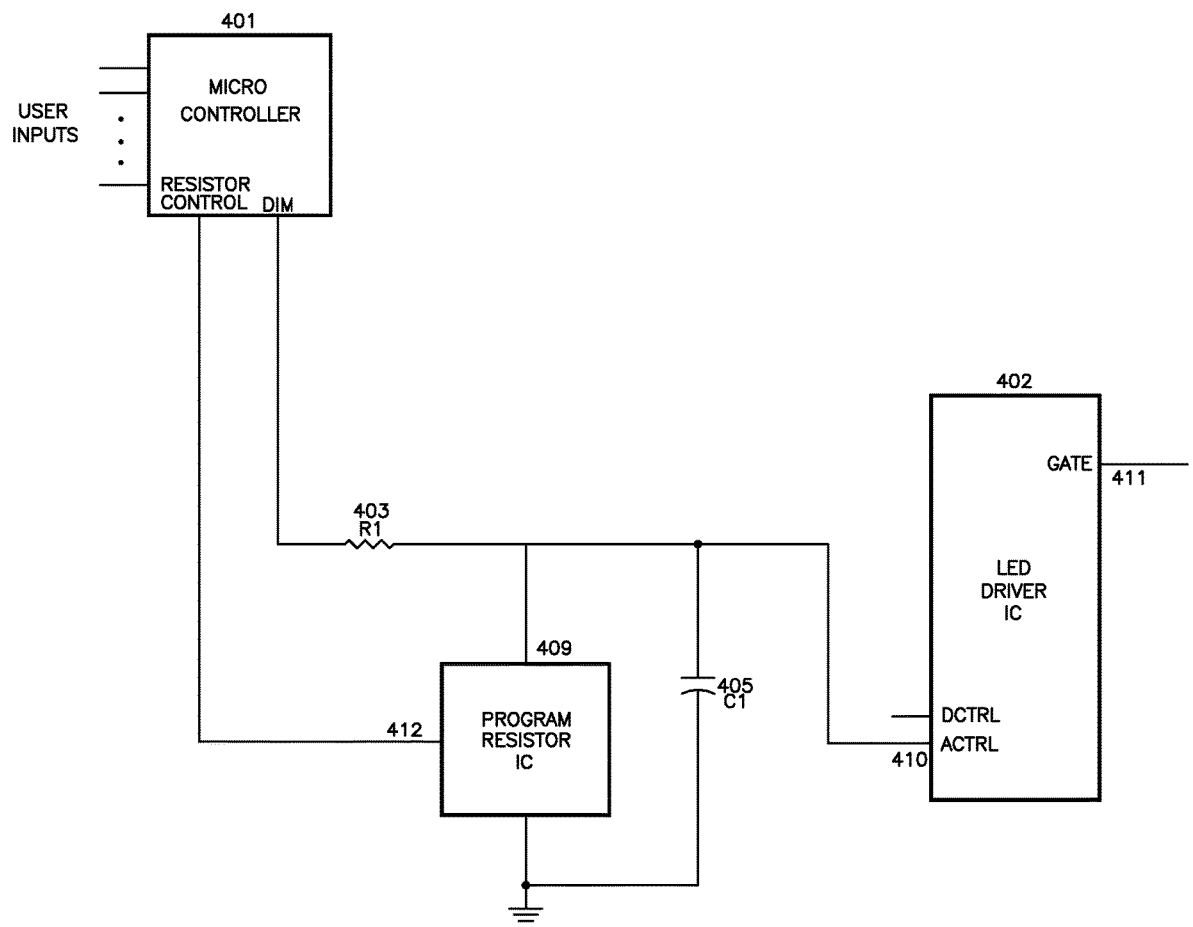
FIG. 4 shows another embodiment in which a programmable resistor IC is used to provide a more continuous adjustment of the time constant of an RC low-pass filter.

FIG. 4 illustrates another set of embodiments in which a programmable resistance/resistor integrated circuit 409 is used to provide an adjustment, which can be nearly continuous in some embodiments, of the time constant of a single RC low-pass filter (in this example, also providing a voltage divider). The embodiment of FIG. 4 is implemented with resistor R1 403, capacitor C1 405, and the programmable resistance IC 409. Programmable resistance ICs are commercially available, in a range of maximum resistance values. In some cases, control of the resistance (ranging between zero ohms and the part's maximum resistance value) is implemented by providing a variable voltage to the programmable resistance IC. In other cases, a serial data bus is used to set the resistance. In either case, a micro-controller 401 can be used to control the resistance of the programmable resistance IC 409, thereby adjusting the time constant of the RC low-pass filter. This control path is shown in FIG. 4 as the RESISTOR CONTROL signal 412. The output of the adjustable RC low-pass filter is fed to the analog voltage control pin ACTRL 410 of the LED driver IC 402. The use of a programmable resistance IC provides a more continuous range of adjustment for the filter's time constant, at the expense of some additional control complexity. Alternate embodiments can also use low-pass filters of different circuit topologies, with adjustable time constant.

Figure 5:
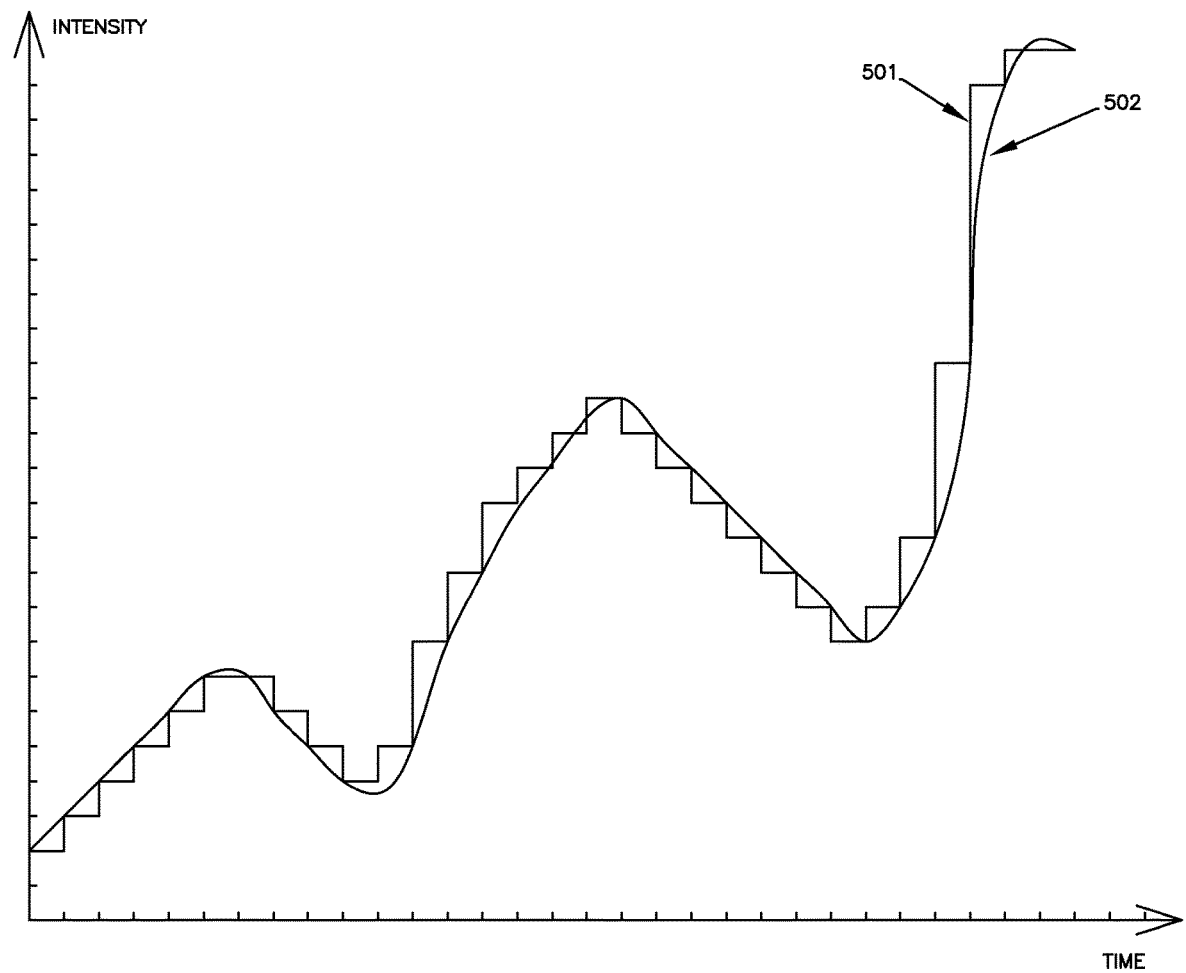
FIG. 5 illustrates the responsiveness of one embodiment in which a "fast" (short) time constant for the RC low-pass filter has been selected or programmed.

FIG. 5 provides a graphical illustration of the responsiveness of one embodiment in which the low-pass filter is implementing a relatively "fast" (short) time constant. The vertical axis represents the intended intensity of the LED light fixture, or an LED string within the light fixture, as provided by some form of brightness or dimming control. The horizontal axis represents time. In FIG. 5, the stepped plot 501 represents the unfiltered brightness or dimming control generated by the micro-controller, which is changing over time. The unfiltered brightness or dimming control 501 is shown as changing in small steps, with changes occurring at distinct points in time. This is representative for brightness or dimming control signals that are being provided to the light fixture in digital form, or, alternatively, are being detected by a micro-controller. For example, light fixtures that are being controlled by an external DMX controller are receiving digitized brightness or dimming settings that are on a scale of 0-255, with changes to the setting occurring at a rate that is a function of the bit rate of the DMX control bus, as well as the number of light fixtures that are being controlled over separate DMX channels. Even in the case of a manual brightness or dimming control knob or slider, a micro-controller may be digitizing the knob setting, and updating this representation of the knob setting at some rate, based on the design of the micro-controller's firmware. The "step size" of the micro-controller's brightness or dimming control output may also be determined by the number of bits used in any digital-to-analog converter (DAC) circuits used in the signal path, whether the DAC(s) are internal to the micro-controller, or external. In short, while the size of the steps in the stepped plot 501, as well as their rate of change, will vary for different LED light implementations, in almost all cases there will be some form of stepped response, at least in cases where a micro-controller is providing the brightness or dimming control signal.

The intent of the low-pass filter with a "fast" (short) time constant, as depicted in FIG. 5, is to provide a fairly minimal level of "smoothing" of the stepped control signal 501. This minimally-smoothed signal is depicted as curve 502. The time constant is designed to smooth out, or filter the step transitions of the unfiltered brightness or dimming control signal 501, while still being able to track fairly rapid and large changes in the desired or intended intensity. This fast response time is suitable for applications in which the LED light fixture's intensity needs to change rapidly, such as for dynamic lighting effects. Examples might be the recreation of rapidly flashing lights, such as recreations of lightning, flashing police lights, or other effects where changes in brightness, or other lighting characteristics, such as color, need to occur quickly. The time constant of the low-pass filter for this sort of application might be in the general range of 1 msec, or a few msec, up to perhaps 10 msec. Note that the optimal time constant will depend on multiple factors, such as the step size of the micro-controller's unfiltered brightness or dimming control, as well as the rate at which the micro-controller's unfiltered control signal can change. In some embodiments, the user can directly select or set the filter's time constant. In other embodiments, the user might be selecting a special effect feature, or mode of operation, and then the micro-controller will select or set a fast time constant, appropriate for the selected special effect feature. It is also within the scope of the present invention for the micro-controller to analyze the dynamic characteristics of the received brightness control signal, and to base its selection or setting of the time constant, on that analysis. In the case of an external DMX controller with RDM capability, the light fixture may also provide information on its time constant setting, back to the DMX controller.

Figure 6:
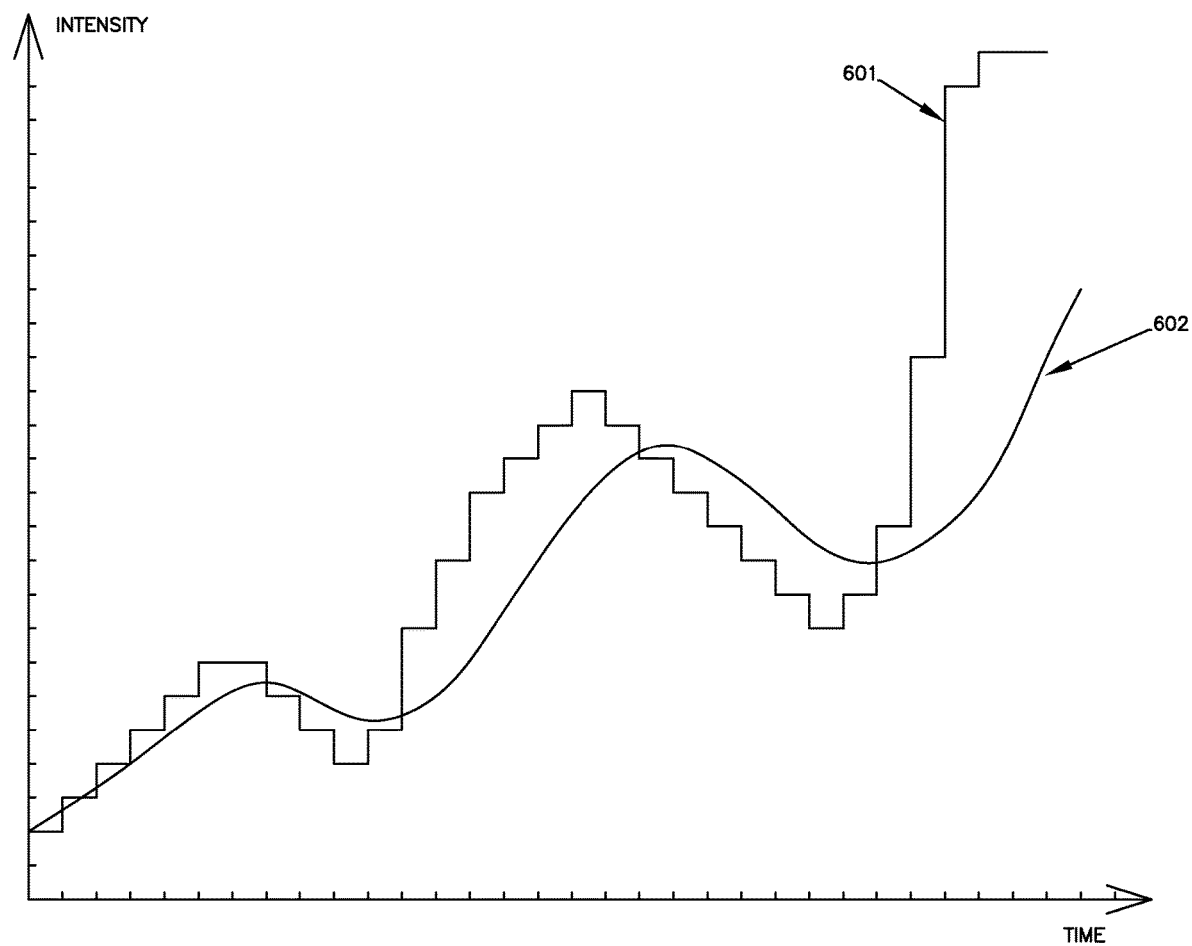
FIG. 6 illustrates the responsiveness of one embodiment in which a "slow" (long) time constant for the RC low-pass filter has been selected or programmed.

Even though the intent of the fast time constant low-pass filter is to provide some degree of smoothing of the stepped, unfiltered control signal from the micro-controller, large changes in the unfiltered control signal 501 may still be perceived by the human eye as being stepped changes. FIG. 6 provides a graphical illustration of the responsiveness of one embodiment in which the low-pass filter is implementing a relatively "slow" (long) time constant. In FIG. 6, the stepped control signal 601 is the same as the stepped control signal 501, that was shown in FIG. 5. Due to the longer time constant of the low-pass filter, the resulting smoothed or filtered signal 602 responds much more gradually to changes in the stepped control signal 601. Large, abrupt changes in the stepped control signal result in a slow change in the filtered brightness or dimming control signal, as fed to the LED driver circuit(s). This will further reduce, or remove, any perceived "stepped" changes in the LED light fixture's brightness. This creates a more natural appearing changed in brightness, for applications that are not intended to be representing flashing lights. For example, it will allow smooth dimming, similar to how an incandescent bulb looks when being dimmed by a wall dimmer, even if the user input to the LED lighting fixture is changed abruptly. The optimal time constant needed for this "slow" (long) time constant low-pass filter will depend on the exact effect desired, but will typically be on the order of tens of msec, or even hundreds of msec.

As discussed earlier, in reference to the embodiments shown in FIGS. 3 and 4, the time constant setting for the low-pass filter(s) may be a choice of two or more discrete time constants, or it may be more continuously adjustable over a range of time constant settings. In the case of just two or a few discrete time constant settings, a simple switch on the LED light fixture housing could be used by the user to select a "fast" or "slow" time constant. Use of a continuously-adjustable filter provides more user flexibility, but also requires a more complex user-control interface. In many, or even most LED lighting applications, two choices of low-pass filter time constant will suffice. The slow (long) time constant will be suitable for most lighting applications, where the intensity of the LED light fixture does not need to change rapidly. The fast (short) time constant will be suitable where the LED light fixture is being used to recreate lighting effects that require rapid changes in intensity. Control of the low-pass filter's time constant can be via a manual user interface, such as a switch, knob, or slider, or it can be provided by an external controller, such as a DMX controller, with or without RDM capability. The selection of filter time constant may also be made by the light fixture's micro-controller, as an indirect response to some user input, such as the user's selection of a mode of operation, special lighting effect, or even an analysis of the received brightness control signal.

In a common application, the embodiments of FIGS. 3 and 4 and their variations will be part of an LED light fixture. In many embodiments the components can be mounted on a printed circuit board (PCB), or sometimes multiple PCBs. The PCB or PCBs of the light fixture can have a micro-controller and multiple LED driver circuits, similar to the representation in FIG. 1. LED strings can be arranged as one or more LED arrays, each LED array comprising one or more separately driven LED strings. Each LED array may include a lens (for example, a half-ball lens). An array package can have additional optics, such as one or more additional lenses, reflectors, or diffusers, positioned "in front" (in the optical path of the emitted light) of the array. Wires or ribbon cables can be used to connect the electrical pins of the array to the multiple LED driver circuits. The overall fixture housing can have knobs and displays for control functions, as well as electrical connector(s) for external control, such as from an external DMX controller. The fixture can also contain one or more heat sinks, and often a fan, to extract heat from the LED array and from the driver circuits.

In other applications, the components of FIGS. 3 and 4 can be embodied as a "light engine", rather than a complete light fixture. Depending on the specific embodiment, a light engine might include the elements of FIGS. 3 and 4 on a circuit board for use with a separately packaged LED array. Alternately, it could be a larger subset of the components of a complete fixture, such as the LED array with PCB (with driver circuits and micro-controller), or it might be even more complete, missing only the light fixture's outer housing.

Figure 7:
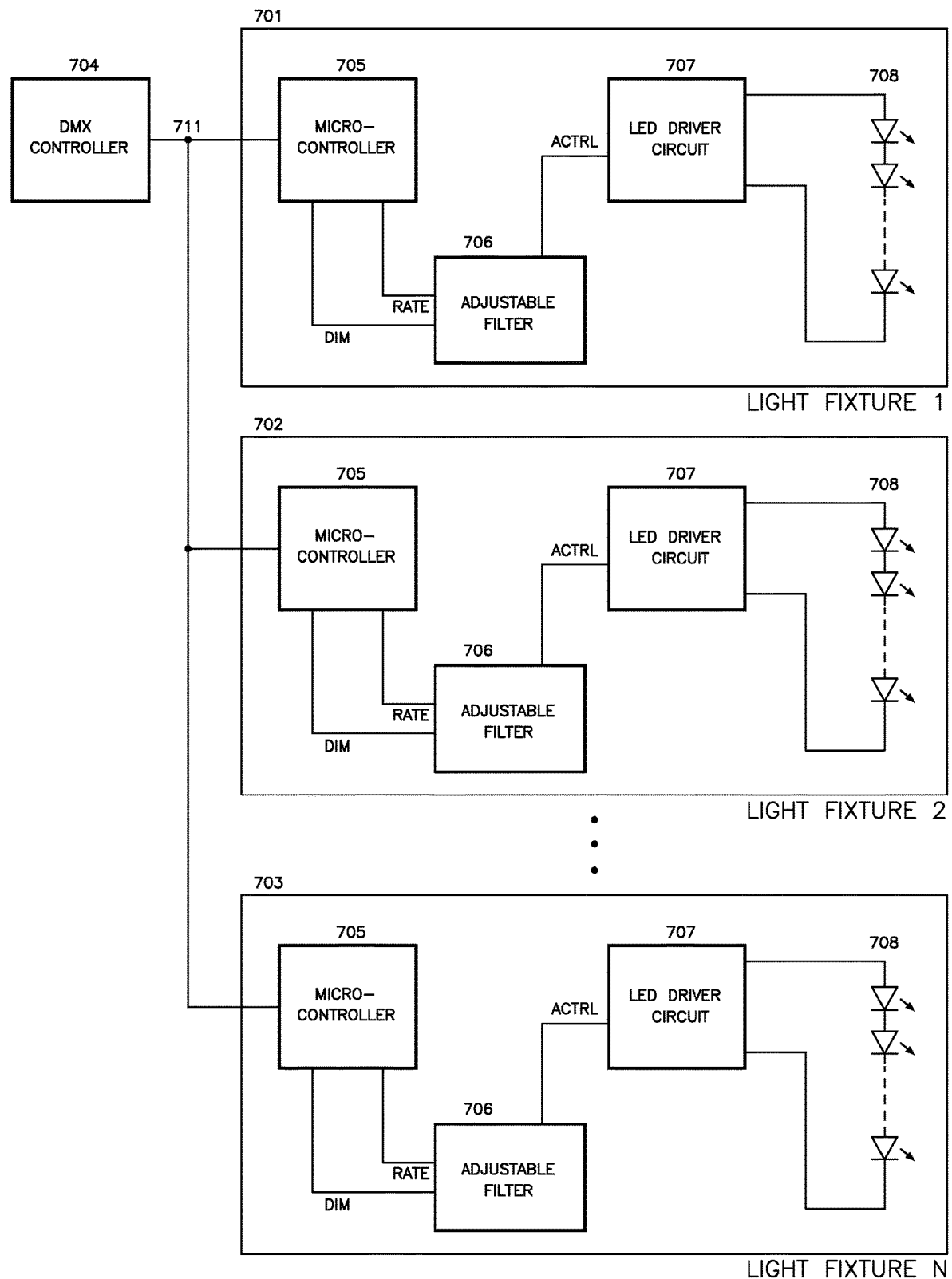
FIG. 7 illustrates an embodiment of a lighting system including a system controller and a number of lighting fixtures, such as those of the embodiments illustrated in FIGS. 3 and 4.

FIG. 7 illustrates an embodiment of a lighting system including a system controller 704 and a number of lighting fixtures (701, 702, 703), such as those of the embodiments illustrated in FIGS. 3 and 4. In the example of FIG. 7, the system controller 704 is a DMX controller connected over a serial bus 711 that implements the DMX-512 protocol/format, for example. This allows for the system controller to set the brightness and/or dimming rate settings for each of the lighting fixtures 701, 702, and 703 independently. This arrangement allows for some light fixtures to be set with a fast dimming rate as illustrated by FIG. 5 (such as to represent lightning, flashing police lights, or other effects) where changes in brightness or other lighting characteristics (such as color) are wanted to occur quickly, while others of the light fixtures can concurrently be set to have a slow dimming rate as illustrated in FIG. 6, representing how an incandescent bulb looks when being dimmed by a wall dimmer, for example.

FIG. 7 shows the system controller 704 connected to three light fixtures, light fixture 1 701, light fixture 2 702, and light fixture N 703. Each of the light fixtures can be independently controlled and the number of light figures that can used with a system controller 704 depends upon the controller, where a DMX controller may have up to 512 independently settable parameters. Each of the light fixtures 701, 702, and 703 can be as described above with respect to FIGS. 3-6, where these can also be combined in a system with other light fixtures of different designs, including those without adjustable dimming. Each of light FIGS. 701, 702, and 703 is shown to include a string of LEDs 708, and LED driver 707, and a micro-controller 705 that is connected to receive the control signals over bus 711 from the system controller. Based on the input from the system controller 704, the micro-controller 705 provides the DIM and RATE control signals to the adjustable filter 706, with in turn provides the ACTRL signal to the LED driver circuit 707.

In each of the light fixtures 701, 702, and 703, the adjustable filter can be as described above with respect to the embodiments of FIGS. 3 and 4. Although the micro-controller 705 for the light fixtures of FIG. 7 is shown to control only a single adjustable filter 706, a single LED driver 708, and a single string of LEDs 708, it may also be controlling additional LED drivers in the light fixtures, each of which could have an adjustable filter. In some embodiments, a separate adjustable filter is used for each LED driver circuit. Depending on the embodiment, the control of the adjustable filter (control of its time constant) from the micro-controller could be a single control signal (or set of control signals) that is applied to all of the adjustable filters, or the micro-controller could provide separate controls for each driver circuit's adjustable filter.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

It is claimed:

1. An apparatus, comprising:
a first light emitting diode (LED) driver configured to receive a first control voltage and to drive one or more LEDs connected thereto at a brightness level dependent upon a level of the first control voltage;
a controller configured to provide a first output voltage in response to a first user input and to provide a first one of a plurality of dimming rate settings in response to a second user input; and
a first adjustable low pass filter circuit having a plurality of selectable time constant values, the first adjustable low pass filter circuit configured to:
receive and filter the first output voltage from the controller and provide the filtered first output voltage as the first control voltage to the first LED driver, and
receive the first dimming rate setting from the controller and to filter changes in the first output voltage from the controller at one of the time constant values selected in response to the first dimming rate setting.

2. The apparatus of claim 1, wherein the first adjustable low pass filter comprises:
a plurality of resistance-capacitance (R-C) low pass filters having a corresponding one of the plurality of time constant values; and
one or more switches connected to receive the first dimming rate setting and configured to select one of the plurality of R-C low pass filters in response thereto.

3. The apparatus of claim 2, wherein the number of the R-C low pass filters is three or more and the one or more switches are a plurality of switches.

4. The apparatus of claim 1, wherein the first adjustable low pass filter comprises:
one or more capacitors;
a plurality of resistors; and
one or more switches connected to receive the first dimming rate setting and configured to select one or more of the plurality of resistors to connect to form a low-pass filter with the capacitor in response thereto.

5. The apparatus of claim 1, wherein the first adjustable low pass filter comprises:
a plurality of capacitors;
one or more resistors; and
one or more switches connected to receive the first dimming rate setting and configured to select one or more of the plurality of capacitors to connect to form a low-pass filter with the capacitor in response thereto.

6. The apparatus of claim 1, wherein the first adjustable low pass filter comprises:
a resistance-capacitance (R-C) low pass filter comprising:
a capacitance; and
a programmable resistor having one of a plurality of selectable resistance values connected to receive the first dimming rate setting and select one of the plurality resistance values in response thereto.

7. The apparatus of claim 1, further comprising:
a printed circuit board on which the LED driver, the controller, and first adjustable low filter are connected.

8. The apparatus of claim 7, further comprising:
the one or more LEDs that the first LED driver is configured to drive.

9. The apparatus of claim 1, wherein the controller is configured to receive the first user input and the second user input over a serial control interface.

10. The apparatus of claim 9, wherein the first user input and the second user input are received as a digital signal.

11. The apparatus of claim 10, wherein the digital signal is a DMX signal.

12. The apparatus of claim 11, wherein the digital signal is a DMX signal with remote device management (RDM) capability.

13. The apparatus of claim 11, wherein the DMX signal is embedded in another protocol.

14. The apparatus of claim 13, wherein the DMX signal is embedded in a wireless interface protocol.

15. The apparatus of claim 13, wherein the DMX signal is embedded in a packet data interface protocol.

16. The apparatus of claim 11, the DMX signal is in a DMX-512 format.

17. The apparatus of claim 1, wherein the apparatus further comprises:
one or more manual user interfaces, the controller configured to receive the first user input and the second user input from the manual user interfaces.

18. The apparatus of claim 17, wherein the one or more manual user interfaces include one or more of a knob, a slider, and a switch.

19. The apparatus of claim 1, further comprising:
one or more additional light emitting diode (LED) drivers each configured to receive the first control voltage and to drive one or more LEDs connected thereto at a brightness level dependent upon the level of the first control voltage,
the first adjustable low pass filter circuit configured to:
receive and filter the first output voltage from the controller and provide the filtered first output voltage as the first control voltage to a corresponding one of the additional LED drivers, and
receive the first dimming rate setting from the controller and to filter changes in the first output voltage from the controller at one of the time constant values selected in response to the first dimming rate setting.

20. The apparatus of claim 1, further comprising:
one or more additional light emitting diode (LED) drivers each configured to receive a corresponding control voltage and to drive one or more LEDs connected thereto at a brightness level dependent upon the level of the corresponding control voltage; and
one or more additional adjustable low pass filter circuits each having a plurality of selectable time constant values, each additional adjustable low pass filter circuit configured to:
receive and filter a corresponding additional output voltage from the controller and provide the filtered corresponding additional output voltage as the control voltage to a corresponding LED driver, and
receive a corresponding dimming rate setting from the controller and to filter changes in the corresponding additional output voltage from the controller at one of the time constant values selected in response to the corresponding dimming rate setting,
wherein the controller is further configured to provide the corresponding one or more additional output voltages in response to a corresponding additional first user input and to provide the one or more corresponding dimming rate settings in response to a corresponding additional second user input.

21. The apparatus of claim 1, further comprising:
one or more additional light emitting diode (LED) drivers each configured to receive a corresponding control voltage and to drive one or more LEDs connected thereto at a brightness level dependent upon the level of the corresponding control voltage; and
one or more additional adjustable low pass filter circuits each having a plurality of selectable time constant values, each additional adjustable low pass filter circuit configured to:
receive and filter a corresponding additional output voltage from the controller and provide the filtered corresponding additional output voltage as the control voltage to a corresponding LED driver, and
receive a corresponding dimming rate setting from the controller and to filter changes in the corresponding additional output voltage from the controller at one of the time constant values selected in response to the corresponding dimming rate setting,
wherein the controller is further configured to provide the corresponding one or more additional output voltages in response to a corresponding additional first user input and to provide the one or more corresponding dimming rate settings as an automatic response to the corresponding additional first user input.

22. A lighting system, comprising:
a plurality of light emitting diode (LED) lighting units, each comprising:
one or more LEDs;
one or more LED drivers connected to the LEDs and to receive a control voltage, the one or more LED drivers configured to drive the LEDs to have a brightness level dependent on the control voltage;
a micro-controller configured to receive a user control signal and, in response to the user control signal, provide an output voltage and a dimming rate setting; and
an adjustable filter connected to the driver and the micro-controller and configured to receive output voltage, filter changes in the output voltage with one of a plurality of time constants selected in response to the dimming rate setting, and supply the filtered output voltage to the driver as the control voltage; and
a system controller connected to the plurality of LED lighting units, the system controller configured to supply an individual control signal to each of the LED lighting units to independently specify the output voltage and the dimming rate setting for each of the micro-controllers.

23. The lighting system of claim 22, wherein the system controller is a DMX controller.

24. The lighting system of claim 23, wherein the system controller is a DMX controller, with remote device management (RDM) capability.

25. The lighting system of claim 23, wherein the DMX signal is embedded in another protocol.

26. The lighting system of claim 25, wherein the DMX signal is embedded in a wireless interface protocol.

27. The lighting system of claim 25, wherein the DMX signal is embedded in a packet data interface protocol.

28. The lighting system of claim 23, wherein the system controller is configured to supply the individual control signals in a DMX-512 format.

29. The lighting system of claim 22, wherein the adjustable filter comprises:
a plurality of resistance-capacitance (R-C) low pass filters having a corresponding one of the plurality of time constant values; and
one or more switches connected to receive the first dimming rate setting and configured to select one of the plurality of R-C low pass filters in response thereto.

30. The lighting system of claim 22, wherein the adjustable filter comprises:
   a resistance-capacitance (R-C) low pass filter comprising:
      a capacitance; and
      a programmable resistor having a plurality of resistance values connected to receive the first dimming rate setting and select one of the plurality resistance values in response thereto.

\* \* \* \* \*